United States Patent
Huang

(10) Patent No.: US 7,451,544 B1
(45) Date of Patent: Nov. 18, 2008

(54) GARDENING SHEARS HAVING DOUBLE FUNCTIONS

(75) Inventor: Yao-Chung Huang, Changhua Hsien (TW)

(73) Assignee: Ho Cheng Garden Tools Co., Ltd., Changhua Hsien (TW)

( * ) Notice: Subject to any disclaimer, the term of this patent is extended or adjusted under 35 U.S.C. 154(b) by 259 days.

(21) Appl. No.: 11/054,975

(22) Filed: Feb. 10, 2005

(51) Int. Cl.
  *B25F 3/00* (2006.01)
(52) U.S. Cl. .............................. 30/123; 30/131; 30/132; 30/194; 30/279.2
(58) Field of Classification Search .............. 30/131, 30/132, 145, 194, 244, 229, 241, 123, 142, 30/278, 279.2; 47/6
  See application file for complete search history.

(56) References Cited

U.S. PATENT DOCUMENTS

| | | | | |
|---|---|---|---|---|
| 1,759,553 A | * | 5/1930 | Henault | 140/123.6 |
| 3,719,992 A | * | 3/1973 | Reisner | 30/131 |
| 4,531,290 A | * | 7/1985 | Plesa | 30/178 |
| 5,033,194 A | * | 7/1991 | Long | 30/241 |
| 5,226,236 A | * | 7/1993 | Harrington, III | 30/134 |

\* cited by examiner

*Primary Examiner*—Boyer D Ashley
*Assistant Examiner*—Omar Flores-Sánchez
(74) *Attorney, Agent, or Firm*—Alan Kamrath; Kamrath & Associates PA

(57) ABSTRACT

A pair of gardening shears include a first cutting member, a second cutting member, an end cap, and a sliding member. Thus, the gardening shears are used to cut branches or leaves and are available for a grafting purpose, thereby enhancing the versatility of the gardening shears. In addition, the male slip of the son plant and the female slip of the mother plant are formed by the blade of the sliding member to match each other exactly, so that the male slip of the son plant is inserted into and combined with the female slip of the mother plant rigidly and closely, thereby enhancing the grafting effect of the son plant and the mother plant.

16 Claims, 4 Drawing Sheets

GARDENING SHEARS HAVING DOUBLE FUNCTIONS

BACKGROUND OF THE INVENTION

1. Field of the Invention

The present invention relates to a pair of gardening shears, and more particularly to a pair of gardening shears having double functions.

2. Description of the Related Art

As shown in FIG. 7, a pair of conventional gardening shears can prune a son plant 20 and a mother plant 10 to form a V-shaped female slip 11 in the mother plant 10 and an oblique male slip 21 in the son plant 20. Then, the male slip 21 of the son plant 20 inserted into the female slip 11 of the mother plant 10, and the male slip 21 of the son plant 20 is combined with the female slip 11 of the mother plant 10 by a tape, thereby accomplishing the grafting work of the son plant 20 and the mother plant 10. However, the male slip 21 of the son plant 20 and the female slip 11 of the mother plant 10 have a relatively smaller contact area 1, thereby decreasing the grafting quality of the son plant 20 and the mother plant 10. In addition, a gap 2 is defined between the male slip 21 of the son plant 20 and the female slip 11 of the mother plant 10, so that the male slip 21 of the son plant 20 is not combined with the female slip 11 of the mother plant 10 closely, thereby decreasing the grafting effect of the son plant 20 and the mother plant 10.

SUMMARY OF THE INVENTION

In accordance with the present invention, there is provided a pair of gardening shears, comprising a first cutting member having an end portion provided with a resting plate having a first end formed with a first opening; a second cutting member pivotally mounted on the first cutting member and having an end portion movably mounted on a first side of the resting plate of the first cutting member; an end cap secured on a second side of the resting plate of the first cutting member and having a first end formed with a second opening aligning with the first opening of the resting plate of the first cutting member; and a sliding member slidably mounted between the resting plate of the first cutting member and the end cap and having a mediate portion formed with an outwardly extended bent blade that is driven by movement of the end portion of the second cutting member to extend into the first opening of the resting plate of the first cutting member and the second opening of the end cap.

The primary objective of the present invention is to provide a pair of gardening shears having double functions.

Another objective of the present invention is to provide a pair of gardening shears that are used to cut branches or leaves and are available for a grafting purpose, thereby enhancing the versatility of the gardening shears.

A further objective of the present invention is to provide a pair of gardening shears, wherein the male slip of the son plant and the female slip of the mother plant are formed by the blade of the sliding member to match each other exactly, so that the male slip of the son plant is inserted into and combined with the female slip of the mother plant rigidly and closely, thereby enhancing the grafting effect of the son plant and the mother plant.

A further objective of the present invention is to provide a pair of gardening shears, the male slip of the son plant and the female slip of the mother plant have a relatively larger contact area, thereby enhancing the grafting quality of the son plant and the mother plant.

A further objective of the present invention is to provide a pair of gardening shears, wherein the rubber wheel prevents the mother plant and the son plant from being clamped and aids the blade of the sliding member to prune the mother plant and the son plant smoothly.

Further benefits and advantages of the present invention will become apparent after a careful reading of the detailed description with appropriate reference to the accompanying drawings.

DETAILED DESCRIPTION OF THE INVENTION

Figure 1:
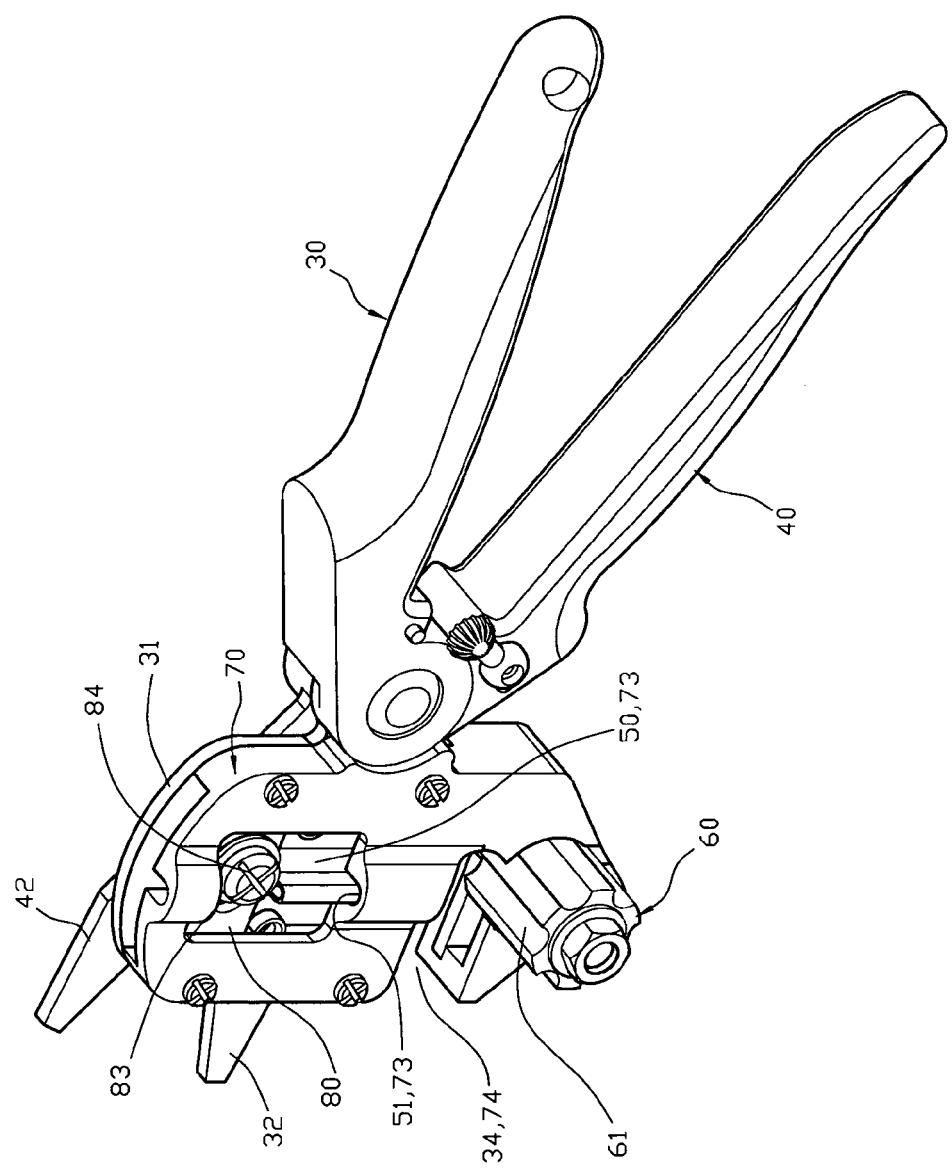
FIG. 1 is a perspective view of a pair of gardening shears in accordance with the preferred embodiment of the present invention.
Figure 2:
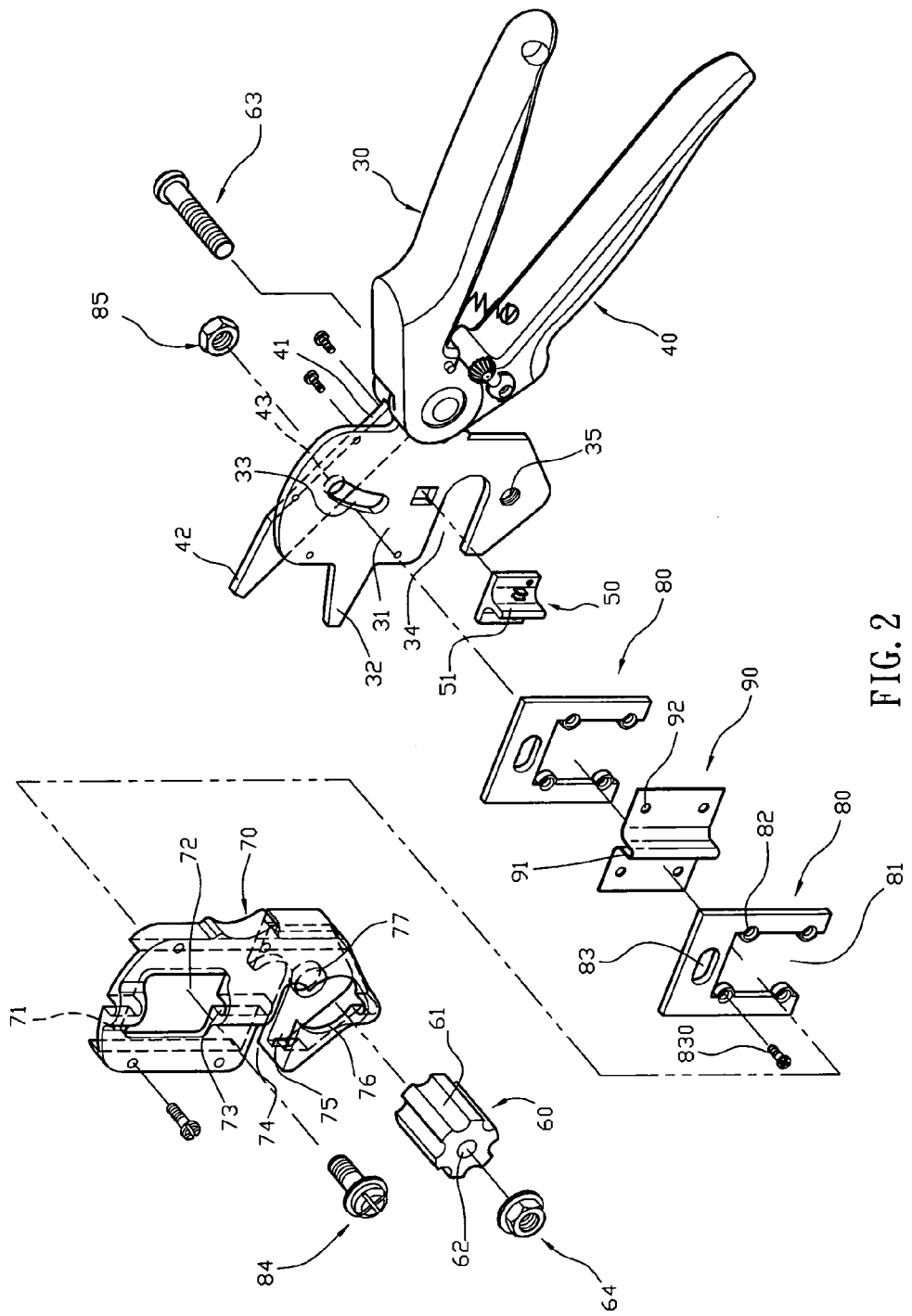
FIG. 2 is an exploded perspective view of the gardening shears as shown in FIG. 1.
Figure 3:
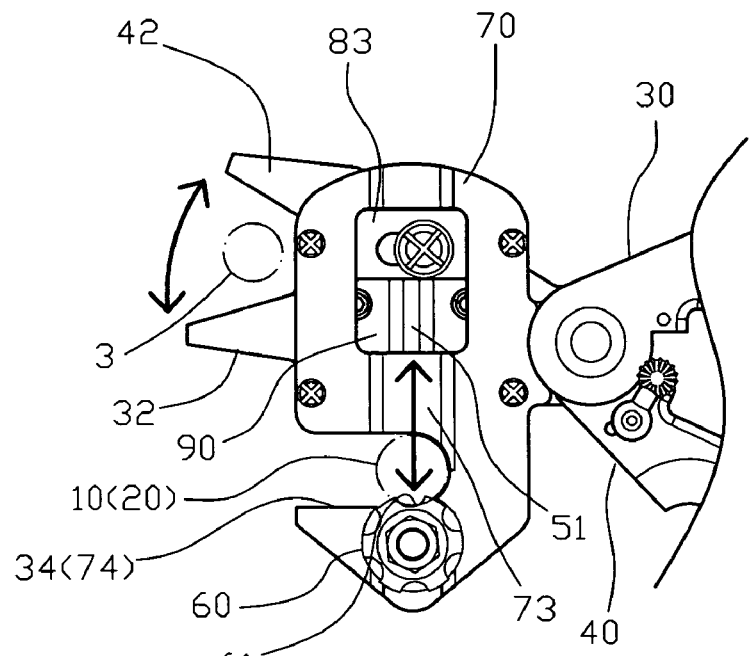
FIG. 3 is a partially cut-away plan operational view of the gardening shears as shown in FIG. 1.

Referring to the drawings and initially to FIGS. 1-3, a pair of gardening shears in accordance with the preferred embodiment of the present invention comprise a first cutting member 30 having an end portion provided with a resting plate 31 having a first end formed with a first opening 34, a second cutting member 40 pivotally mounted on the first cutting member 30 and having an end portion 41 movably mounted on a first side of the resting plate 31 of the first cutting member 30, an end cap 70 secured on a second side of the resting plate 31 of the first cutting member 30 and having a first end formed with a second opening 74 aligning with the first opening 34 of the resting plate 31 of the first cutting member 30, and a sliding member 90 slidably mounted between the resting plate 31 of the first cutting member 30 and the end cap 70 and having a mediate portion formed with an outwardly extended bent blade 91 that is driven by movement of the end portion 41 of the second cutting member 40 to extend into the first opening 34 of the resting plate 31 of the first cutting member 30 and the second opening 74 of the end cap 70.

The resting plate 31 of the first cutting member 30 has a second end formed with an arcuate guide slot 33 and a first cutting blade 32. The first end of the resting plate 31 of the first cutting member 30 is formed with a locking bore 35 located under the first opening 34.

The end portion 41 of the second cutting member 40 has a mediate portion formed with a locking hole 43 and a distal end formed with a second cutting blade 42 located opposite to the first cutting blade 32 of the first cutting member 30.

The end cap 70 has a second end formed with a passage 72 to allow passage of the blade 91 of the sliding member 90 and a slideway 73 to guide movement of the blade 91 of the sliding member 90. The first end of the end cap 70 has a first side formed with a receiving recess 76 to receive a rubber wheel 60 located under the blade 91 of the sliding member 90 and a second side formed with a through hole 77. The receiving recess 76 of the end cap 70 has a side formed with a cutout 75 connected to the second opening 74 of the end cap 70. The rubber wheel 60 has a periphery formed with a plurality of arcuate grooves 61 facing the second opening 74 of the end cap 70 and has a central portion formed with a through bore 62. A screw 63 is extended through the locking bore 35 of the resting plate 31 of the first cutting member 30, the through hole 77 of the end cap 70 and the through bore 62 of the rubber wheel 60, and a nut 64 is screwed onto the screw 63 to secure the rubber wheel 60 on the end cap 70.

The gardening shears further comprise a guide member 50 having a first side secured on the second side of the resting plate 31 of the first cutting member 30 and located above the first opening 34 of the resting plate 31 and a second side formed with a guide rail 51 inserted into the blade 91 of the sliding member 90 to guide movement of the blade 91 of the sliding member 90, two substantially inverted U-shaped clamping members 80 secured on the sliding member 90 to move the sliding member 90 therewith and movably mounted between the resting plate 31 of the first cutting member 30 and the end cap 70, a locking screw 84 extended through each of the clamping members 80, the arcuate guide slot 33 of the resting plate 31 of the first cutting member 30 and the locking hole 43 of the end portion 41 of the second cutting member 40, and a locking nut 85 screwed onto the locking screw 84 to secure the clamping members 80 to the end portion 41 of the second cutting member 40, so that the clamping members 80 and the sliding member 90 are moved in concert with the end portion 41 of the second cutting member 40, and the sliding member 90 is slidable between the resting plate 31 of the first cutting member 30, the guide member 50 and the end cap 70.

Each of the clamping members 80 has a plurality of screw bores 82, and the sliding member 90 is sandwiched between the clamping members 80 and has a plurality of screw holes 92 secured to the screw bores 82 of the clamping members 80 by a plurality of screws 830. Each of the clamping members 80 has a first end formed with an opening 81 to allow passage of the blade 91 of the sliding member 90 and a second end formed with an oblong slot 83 to allow passage of the locking screw 84. The end cap 70 has a side formed with a receiving space 71 to receive the clamping members 80.

When the gardening shears are used to cut a branch 3, the first cutting member 30 is pivoted relative to the second cutting member 40, so that the first cutting blade 32 of the first cutting member 30 is moved relative to the second cutting blade 42 of the second cutting member 40 to cut the branch 3 as shown in FIG. 3.

Figure 4:
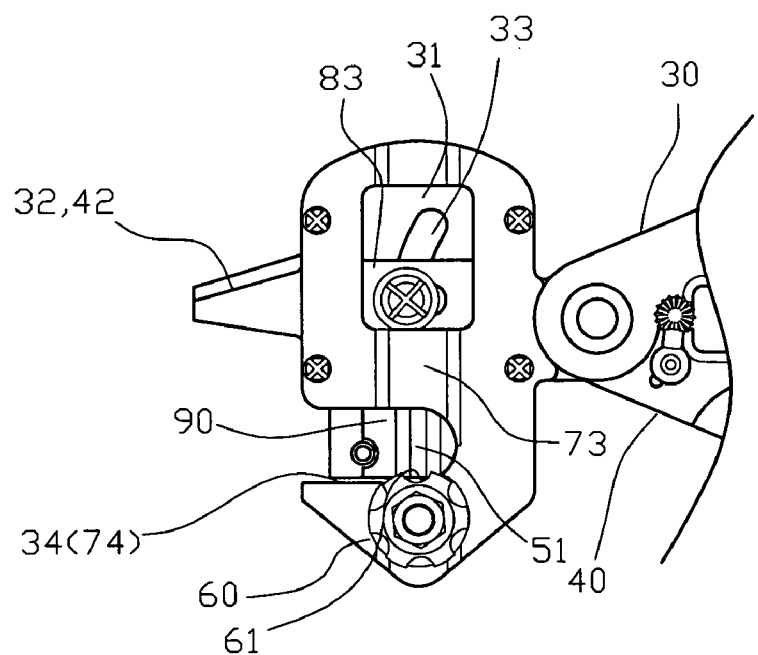
FIG. 4 is a schematic operational view of the gardening shears as shown in FIG. 3.
Figure 6:
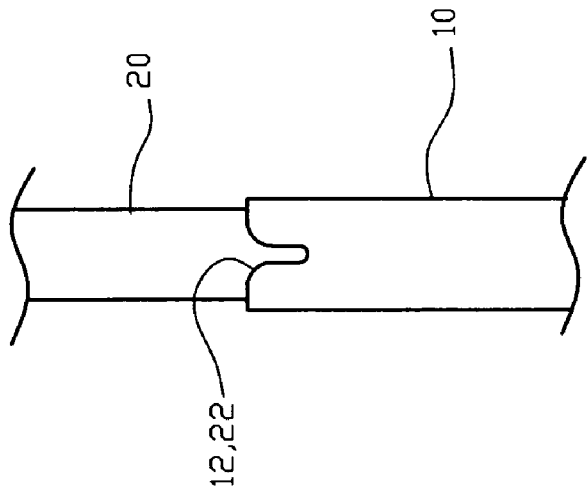
FIG. 6 is a plan assembly view of the son plant and the mother plant as shown in FIG. 5.
Figure 5:
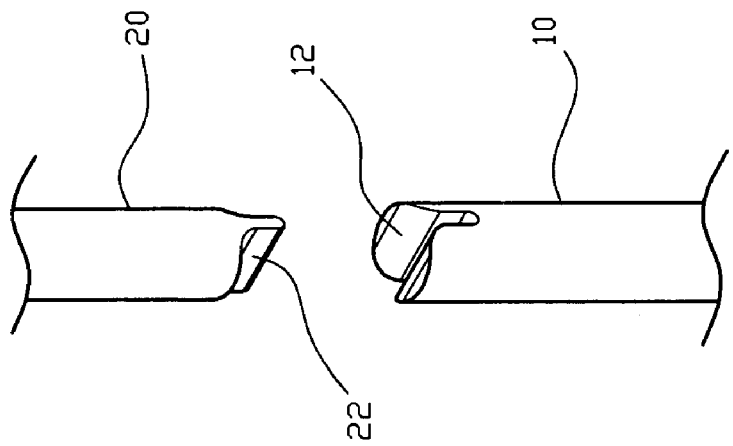
FIG. 5 is an exploded perspective view of a son plant and a mother plant cut by the gardening shears as shown in FIG. 1.
Figure 7:
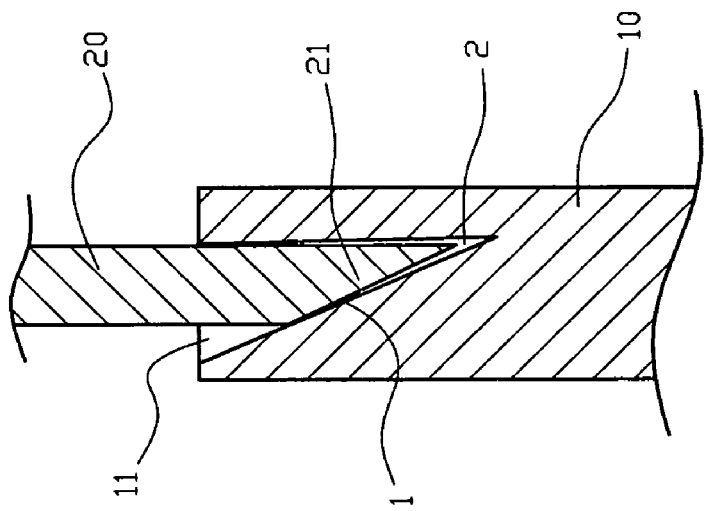
FIG. 7 is a plan cross-sectional assembly view of a son plant and a mother plant cut by a pair of conventional gardening shears in accordance with the prior art.

Alternatively, referring to FIGS. 3-6, when the gardening shears are used to graft a son plant 20 to a mother plant 10, the mother plant 10 or the son plant 20 is placed into the first opening 34 of the resting plate 31 of the first cutting member 30 and the second opening 74 of the end cap 70 as shown in FIG. 3. Then, the second cutting member 40 is moved relative to the first cutting member 30 to drive the sliding member 90 to slide linearly between the slideway 73 of the end cap 70 and the guide rail 51 of the guide member 50, so that the blade 91 of the sliding member 90 is extended into the first opening 34 of the resting plate 31 of the first cutting member 30 and the second opening 74 of the end cap 70 to prune the mother plant 10 or the son plant 20 as shown in FIG. 4, thereby forming a female slip 12 in the mother plant 10 or a male slip 22 in the son plant 20 as shown in FIGS. 5 and 6. In addition, the rubber wheel 60 prevents the mother plant 10 and the son plant 20 from being clamped and aids the blade 91 of the sliding member 90 to prune the mother plant 10 and the son plant 20 smoothly.

As shown in FIGS. 5 and 6, the male slip 22 of the son plant 20 matches the female slip 12 of the mother plant 10, so that the male slip 22 of the son plant 20 is inserted into and combined with the female slip 12 of the mother plant 10 rigidly and closely.

Accordingly, the gardening shears are used to cut branches or leaves and are available for a grafting purpose, thereby enhancing the versatility of the gardening shears. In addition, the male slip 22 of the son plant 20 and the female slip 12 of the mother plant 10 are formed by the blade 91 of the sliding member 90 to match each other exactly, so that the male slip 22 of the son plant 20 is inserted into and combined with the female slip 12 of the mother plant 10 rigidly and closely, thereby enhancing the grafting effect of the son plant 20 and the mother plant 10. Further, the male slip 22 of the son plant 20 and the female slip 12 of the mother plant 10 have a relatively larger contact area, thereby enhancing the grafting quality of the son plant 20 and the mother plant 10. Further, the rubber wheel 60 prevents the mother plant 10 and the son plant 20 from being clamped and aids the blade 91 of the sliding member 90 to prune the mother plant 10 and the son plant 20 smoothly.

Although the invention has been explained in relation to its preferred embodiment(s) as mentioned above, it is to be understood that many other possible modifications and variations can be made without departing from the scope of the present invention. It is, therefore, contemplated that the appended claim or claims will cover such modifications and variations that fall within the true scope of the invention.

What is claimed is:

1. A pair of gardening shears, comprising:
   a first cutting member having an end portion provided with a resting plate having a first end formed with a first opening;
   a second cutting member pivotally mounted on the first cutting member and having an end portion movably mounted on a first side of the resting plate of the first cutting member;
   an end cap secured on a second side of the resting plate of the first cutting member and having a first end formed with a second opening aligning with the first opening of the resting plate of the first cutting member;
   a sliding member slidably mounted between the resting plate of the first cutting member and the end cap and having a mediate portion formed with an outwardly extended bent blade that is driven by movement of the end portion of the second cutting member to extend into the first opening of the resting plate of the first cutting member and the second opening of the end cap;
   two clamping members secured on the sliding member to move the sliding member therewith and movably mounted between the resting plate of the first cutting member and the end cap;
   wherein the resting plate of the first cutting member has a second end formed with an arcuate guide slot, the end portion of the second cutting member has a mediate portion formed with a locking hole, and the gardening shears further comprise a locking screw extended through each of the clamping members, the arcuate guide slot of the resting plate of the first cutting member and the locking hole of the end portion of the second cutting member, and a locking nut screwed onto the locking screw to secure the clamping members to the end portion of the second cutting member, so that the clamping members and the sliding member are moved in concert with the end portion of the second cutting member, and the sliding member is slidable between the resting plate of the first cutting member and the end cap.

2. The gardening shears in accordance with claim 1, wherein each of the clamping members is substantially inverted U-shaped.

3. The gardening shears in accordance with claim 1, wherein the sliding member is sandwiched between the clamping members.

4. The gardening shears in accordance with claim 1, wherein each of the clamping members has a plurality of screw bores, and the sliding member has a plurality of screw holes secured to the screw bores of the clamping members by a plurality of screws.

5. The gardening shears in accordance with claim 1, wherein the end cap has a side formed with a receiving space to receive the clamping members.

6. The gardening shears in accordance with claim 1, wherein each of the clamping members has a first end formed with an opening to allow passage of the blade of the sliding member and a second end formed with an oblong slot to allow passage of the locking screw.

7. The gardening shears in accordance with claim 1, wherein the end cap has a second end formed with a passage to allow passage of the blade of the sliding member.

8. The gardening shears in accordance with claim 1, wherein the end cap has a second end formed with a slideway to guide movement of the blade of the sliding member.

9. A pair of gardening shears, comprising:
a first cutting member having an end portion provided with a resting plate having a first end formed with a first opening;
a second cutting member pivotally mounted on the first cutting member and having an end portion movably mounted on a first side of the resting plate of the first cutting member;
an end cap secured on a second side of the resting plate of the first cutting member and having a first end formed with a second opening aligning with the first opening of the resting plate of the first cutting member; and
a sliding member slidably mounted between the resting plate of the first cutting member and the end cap and having a mediate portion formed with an outwardly extended bent blade that is driven by movement of the end portion of the second cutting member to extend into the first opening of the resting plate of the first cutting member and the second opening of the end cap;
wherein the first end of the end cap has a first side formed with a receiving recess to receive a rubber wheel located under the blade of the sliding member.

10. The gardening shears in accordance with claim 9, wherein the first end of the resting plate of the first cutting member is formed with a locking bore, the first end of the end cap has a second side formed with a through hole, the rubber wheel has a central portion formed with a through bore, and the gardening shears further comprise a screw extended through the locking bore of the resting plate of the first cutting member, the through hole of the end cap and the through bore of the rubber wheel, and a nut screwed onto the screw to secure the rubber wheel on the end cap.

11. The gardening shears in accordance with claim 10, wherein the locking bore of the resting plate of the first cutting member is located under the first opening.

12. The gardening shears in accordance with claim 9, wherein the receiving recess of the end cap has a side formed with a cutout connected to the second opening of the end cap.

13. The gardening shears in accordance with claim 9, wherein the rubber wheel has a periphery formed with a plurality of arcuate grooves facing the second opening of the end cap.

14. The gardening shears in accordance with claim 1, further comprising a guide member having a first side secured on the second side of the resting plate of the first cutting member and a second side formed with a guide rail inserted into the blade of the sliding member to guide movement of the blade of the sliding member.

15. The gardening shears in accordance with claim 14, wherein the guide member is located above the first opening of the resting plate.

16. A pair of gardening shears, comprising:
a first cutting member having an end portion provided with a resting plate having a first end formed with a first opening;
a second cutting member pivotally mounted on the first cutting member and having an end portion movably mounted on a first side of the resting plate of the first cutting member;
an end cap secured on a second side of the resting plate of the first cutting member and having a first end formed with a second opening aligning with the first opening of the resting plate of the first cutting member; and
a sliding member slidably mounted between the resting plate of the first cutting member and the end cap and having a mediate portion formed with an outwardly extended bent blade that is driven by movement of the end portion of the second cutting member to extend into the first opening of the resting plate of the first cutting member and the second opening of the end cap;
wherein the resting plate of the first cutting member has a second end formed with a first cutting blade, and the end portion of the second cutting member has a distal end formed with a second cutting blade located opposite to the first cutting blade of the first cutting member.

* * * * *